United States Patent
Hsiao et al.

(10) Patent No.: US 10,404,527 B2
(45) Date of Patent: Sep. 3, 2019

(54) LINK REESTABLISHMENT METHOD AND ELECTRICAL SYSTEM USING THE SAME

(71) Applicant: NATIONAL CHUNG SHAN INSTITUTE OF SCIENCE AND TECHNOLOGY, Taoyuan (TW)

(72) Inventors: Wei-Min Hsiao, Taoyuan (TW); Jeng-Chyan Lin, Taichung (TW); Kuo-Kuang Jen, Taoyuan (TW); Fu-Min Fang, Taoyuan (TW)

(73) Assignee: NATIONAL CHUNG SHAN INSTITUTE OF SCIENCE AND TECHNOLOGY (TW)

( * ) Notice: Subject to any disclaimer, the term of this patent is extended or adjusted under 35 U.S.C. 154(b) by 52 days.

(21) Appl. No.: 15/837,026

(22) Filed: Dec. 11, 2017

(65) Prior Publication Data

US 2019/0182102 A1 Jun. 13, 2019

(51) Int. Cl.
*H04L 12/24* (2006.01)
*H04L 12/40* (2006.01)

(52) U.S. Cl.
CPC .... *H04L 41/0654* (2013.01); *H04L 12/40019* (2013.01); *H04L 12/40045* (2013.01); *H04L 12/40195* (2013.01); *H04L 2012/40215* (2013.01)

(58) Field of Classification Search
None
See application file for complete search history.

(56) References Cited

U.S. PATENT DOCUMENTS

| | | | | |
|---|---|---|---|---|
| 2004/0177170 A1* | 9/2004 | Nakajima | ........... | G06F 11/0757 710/1 |
| 2005/0114463 A1* | 5/2005 | Lee | .......................... | G06F 1/24 709/208 |
| 2006/0104396 A1* | 5/2006 | Soriano | ............... | G06F 13/4282 375/362 |
| 2007/0168580 A1* | 7/2007 | Schumacher | ......... | G06F 13/385 710/30 |
| 2014/0181469 A1* | 6/2014 | Wilson | .............. | G06F 15/17362 712/29 |
| 2015/0151740 A1* | 6/2015 | Hynes | ..................... | B60L 50/64 701/29.2 |

* cited by examiner

*Primary Examiner* — Mohammad S Adhami
(74) *Attorney, Agent, or Firm* — Schmeiser, Olsen & Watts, LLP

(57) ABSTRACT

An electrical system having a master node, at least one slave node and a bus linked to both of the master node and the slave node is illustrated. The master node check whether a reception register of the slave node does not receives a new data for a first time period, and resets the slave node while the reception register of the slave node does not receives the new data for the first time period; and the slave node checks whether the reception register of the slave node does not receives the new data for a second time period, and resets the slave node itself while the reception register of the slave node does not receives the new data for the second time period. Therefore, the communication stability of the electrical system can be enhanced.

20 Claims, 3 Drawing Sheets

LINK REESTABLISHMENT METHOD AND ELECTRICAL SYSTEM USING THE SAME

FIELD OF THE INVENTION

The present disclosure relates to an electrical system, and in particular to a link reestablishment method used in the electrical system for resetting at least failed one of slave nodes in the electrical system, so as to reestablish a link between a master node and the reset node in the electrical system.

BACKGROUND OF THE INVENTION

Before a communication protocol of controller area network (CAN) bus interface is developed, the electric components in the vehicle electrical system mostly communicated with each other by a point-to-point manner for data transmission and commanding. The communication protocol of CAN bus interface can integrate sensors and the controller of the vehicle electrical system by a simple serial bus. Thus, CAN bus interface now is a widely used communication interface in the vehicle electrical system, and it can be further used in the field of industrial control, medical instrument and the automatic control.

Specified by the communication protocol of CAN bus interface, all nodes of the system are linked to a data bus for data transmission and control. Furthermore, the data to be transmitted is packaged into a data packet and the data packet is converted to a differential signal so as to transmit the data to the data bus for achieving the data transmission. The communication protocol of CAN bus interface further specifies several kinds of error frames, such as cyclic redundancy check (CRC) error frame, acknowledge error frame, form error frame, stuff error frame and bit error frame.

The communication protocol of CAN bus interface further specifies the error mechanism, such as error active mechanism, error passive mechanism and bus off mechanism. The counters for respectively accumulating transmitting and receiving errors are used, and when the counting value of the transmitting or receiving error is less than 127, the corresponding node operates in the error active mechanism. In the error active mechanism, when the error occurs for one data packet, the operation for the data packet being transmitted is interrupted, and the corresponding counting value is accumulated. Then, the bus resumes in the normal status, and the data packet is retransmitted.

When the counting value of the transmitting or receiving errors is larger than 127, the corresponding node operates in the error passive mechanism. The error frame can be still transmitted, the corresponding counting value is still accumulated, but the operation of the data packet being transmitted is not interrupted. Then, after the error frame has been transmitted successfully, the corresponding node waits for a time period to retransmit the data packet.

If the counting value of the transmitting or receiving errors is larger than 255 unfortunately, the corresponding node operates in the bus off mechanism. In the bus off mechanism, the corresponding node equivalently operates in the bypass status and is unable to receive and transmit any data packet. The corresponding node must be reset to return the error active mechanism.

In short, CAN bus interface has the robust communication protocol for solving data collision and arbitration, and also has the function for monitoring the status of the bus. However, when burst noise occurs, the bus is still unstable. Even when the node fails, the communication protocol of CAN bus interface merely accumulates the errors through the error frame. Then, when the counting value of the accumulated errors is larger than a predetermined value, the corresponding node is forcedly separated from the bus (i.e. bus off mechanism). The error data packets are prevented from occupying the bus long, but the abnormality of the corresponding node is still not solved.

Accordingly, due to lack of the link reestablishment mechanism, CAN bus interface is not suitable for the application of the battery system with the hierarchical energy management function. When the controller (i.e. master node) cannot obtain the battery information of the battery set (i.e. slave node) several times, the battery set is separated from the bus forcedly. If the battery set is not reset manually, the stability of the supplied electricity will be affected.

SUMMARY OF THE INVENTION

An objective of the present disclosure is to provide a link reestablishment method used in an electrical system, so as to reset a slave node which has communication errors several times or for a time period. Thus, after the slave node is reset, the slave node can link to the bus for continuing communication with the master node. The link reestablishment method can be used in CAN bus interface, such that the communication is not interrupted and the stability of a battery system is enhanced when the electrical system is the battery system of an electrical vehicle, such as electric bus, car, boat, motorcycle and so on.

To achieve at least the above objective, the present disclosure provides a link reestablishment method executed in a master node of an electrical system, comprising: step A: interrupting a current operation of the master node per X second(s), wherein X is a positive number; and for each of slave nodes of the electrical system which communicate with the master node via a bus of the electrical system: step B: obtaining information from a reception register of the slave node; step C: determining whether the reception register receives a new data; step D: accumulating a counting value corresponding to the slave node while the reception register does not receive the new data; step E: checking whether the counting value equals to K, wherein K is a positive integer larger than 2; and step F: sending a reset command to the slave node while the counting value equals to K.

In an embodiment of the present disclosure, the link reestablishment method further comprises: step G: returning the counting value corresponding to the slave node to zero while the reception register receives the new data, and then going back to execute step A.

In an embodiment of the present disclosure, the link reestablishment method further comprises: for each of the slave nodes: step H: going back to execute step A while the counting value does not equal to K; and step I: going back to execute step A after step F is executed.

In an embodiment of the present disclosure, at step C, to determine whether the reception register receives the new data, whether a reception flag is logic high is checked, wherein the reception flag being logic high means the reception register receives the new data.

In an embodiment of the present disclosure, K is 5 and X is 0.5.

To achieve at least the above objective, the present disclosure provides a link reestablishment method executed in a slave node of an electrical system, comprising: step A:

accumulating a counting value; step B: checking whether the counting value overflows; step C: resetting the slave node itself while the counting value overflows; step D: determining whether a reception register of the slave node receives a new data; and step E: going back to execute step A while the reception register of the slave node does not receive the new data.

In an embodiment of the present disclosure, the link reestablishment method further comprises: step F: returning the counting value to zero while the reception register of the slave node receives the new data; and; and step G: returning the counting value to zero after step C is executed.

In an embodiment of the present disclosure, a watch dog timer (WDT) is used to accumulate the counting value and to determine whether the counting value overflows.

In an embodiment of the present disclosure, the counting value overflows means the reception register does not receive the new data for 2 seconds.

To achieve at least the above objective, the present disclosure provides an electrical system having a master node, at least one slave node and a bus linked to both of the master node and the slave node. The master node check whether a reception register of the slave node does not receives a new data for a first time period, and resets the slave node while the reception register of the slave node does not receives the new data for the first time period; and the slave node checks whether the reception register of the slave node does not receives the new data for a second time period, and resets the slave node itself while the reception register of the slave node does not receives the new data for the second time period. Therefore, the communication stability of the electrical system can be enhanced.

In an embodiment of the present disclosure, the first time period is 2.5 seconds, and the second time period is 2 seconds.

In an embodiment of the present disclosure, the master node checks whether a reception flag of the reception register is logic high, and the reception flag being logic high means the reception register receives the new data.

In an embodiment of the present disclosure, a WDT of the slave node is used to count the second period time.

In an embodiment of the present disclosure, the electrical system further comprises a load being an electric vehicle.

In an embodiment of the present disclosure, the electrical system adopts CAN bus interface.

In an embodiment of the present disclosure, the electrical system is a battery system with a hierarchical energy management function, the master node and the slave nodes are respectively a controller and battery sets.

To sum up, the slave node separated from the bus forcedly can be reset by the master node or itself to reestablish the link to the bus, such that communication stability of the electrical system can be enhanced.

DETAILED DESCRIPTION OF THE PREFERRED EMBODIMENTS

To make it easier for the examiner to understand the objects, characteristics and effects of this present disclosure, embodiments together with the attached drawings for the detailed description of the present disclosure are provided.

An embodiment of the present disclosure provides a link reestablishment method used in an electrical system, so as to solve the technical problem of CAN bus interface, which the slave node being forcedly separated from the bus operates in the bus off mechanism until being reset manually. The link reestablishment method can be implemented by a firmware, but the present disclosure is not limited thereto. Through the determination of the programmed firmware, the abnormal slave node can link to the bus again.

Specifically, when the electrical system is a battery system with the hierarchical energy management function in an electrical vehicle (such as electric bus, car, boat, motorcycle and so on), the controller (i.e. mater node) can reset the battery set (i.e. slave node) which is forcedly separated from the bus, or alternatively the battery set can reset itself. Therefore, the battery system is no more in a protection status long, and the stable electricity can be output.

Moreover, an embodiment of the present disclosure provides an electrical system using the above link reestablishment method. The electrical system can adopt CAN bus interface or other bus interface, and the present disclosure is not limited thereto. The electrical system has one master node, a bus, and at least slave node, wherein the bus links to master node and the slave node, such that the master node and the slave node can communicate with each other.

In the electrical system, when the slave node has the communication errors several times or for a time period, the slave node is forcedly separated from the bus (i.e. lost the link to the bus). To prevent the slave node being separated from the bus infinitely, the master node can reset the slave node if the master node finds the reception register of the slave node has no new reception data for a time period, or alternatively, the slave node resets itself if the slave node finds no new reception data comes. It is noted that the electrical system can be the battery system, and the battery system can provide stable electricity since the system collision preventing mechanism and the link reestablishment mechanism are adopted. Furthermore, the ability of communication of the electrical system is also improved since the slave node being separated from the bus can be reset to link to the bus again.

Figure 1:
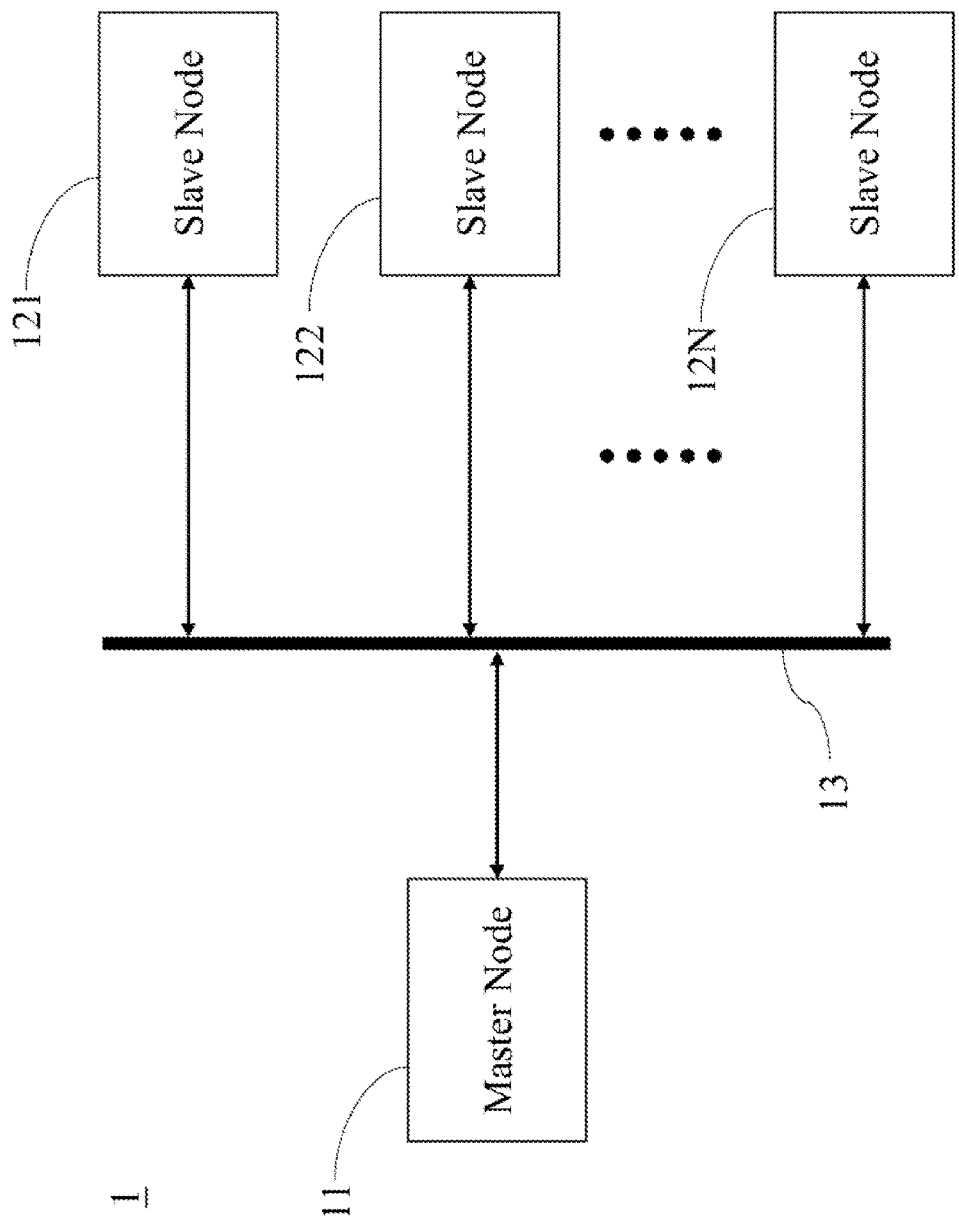
FIG. 1 is a block diagram of an electrical system using a link reestablishment method according to an embodiment of the present disclosure.

Next, referring to FIG. 1, FIG. 1 is a block diagram of an electrical system using a link reestablishment method according to an embodiment of the present disclosure. In FIG. 1, the electrical system 1 comprises a master node 11, a plurality of slave nodes 121-12N and a bus 13, wherein the bus 13 links to the master node 11 and the slave nodes 121-12N, such that the master node 11 can communicate with the slave nodes 121-12N through the bus 13.

The electrical system 1 can adopt CAN bus interface and be a battery system with the hierarchical energy management function, in such case, the master node 11 can be a controller, and the slave nodes 121-12N can be battery sets, wherein the controller is used to manage the electricity (i.e. energy) of the battery sets. However, the present disclosure does not limit the type of the communication protocol (i.e. the type of the bus 13) and the type of the electrical system 1 (i.e. the types of the master node 11 and the slave nodes 121-12N). For the convenience of the descriptions, embodiments of the present disclosure assume the bus 13 is CAN bus, the master node 11 is the controller, and the slave nodes 121-12N are the battery sets.

The master node 11 can transmits data (for example, request for battery set information) to at least one of the slave nodes 121-12N via the bus 13, and at least one of the slave nodes 121-12N can reply other data (for example, battery set information) to master node 11 via the bus 13 after receiving the data from the master node 11. To prevent at least one of the slave nodes 121-12N operates in the bus off mechanism, a link reestablishment method is executed by the master node 11 and the slave nodes 121-12N, such that at least one of the slave nodes 121-12N, which is separated from the bus 13 is reset to reestablish a link with the bus 13.

The master node 11 can interrupt the current operation to monitor reception registers of the slave nodes 121-12N per a time period, such as 0.5 second, and checks whether the reception register of one of the slave nodes 121-12N has not received the new data several times (for example, 5 times) or for other time period. For example, if the reception register of the slave node 121 has not received the new data several times (for example, 5 times) or for the other one time period, the master node 11 will reset the slave node 121, such that slave node 121 can reestablish a link to the bus 13. Then, the slave node 121 will not operate in the bus off mechanism infinitely.

Furthermore, the microcontrollers in the slave nodes 121-12N can have watch dog timer (WDT) functions. When the burst noise induces, at least one of the slave nodes 121-12N may lose their data receiving functions. Each of the slave nodes 121-12N can accumulate a counting value which it does not receive the data from the master node 11, and for example, if the counting value of the slave node 121 overflows (i.e. the slave node 121 does not receive the data for other one time period, such as 2 second), the slave node 121 resets itself to link to the bus 13.

Based upon the above link reestablishment method, the electrical system 1 can stably provide the electricity to the load, such as the electric vehicle or other electric equipment, since the at least error one of the slave nodes 121-12N will not operate in the bus off mechanism infinitely and the communication is continuing after the at least error one of the slave nodes 121-12N is reset to link to the bus 13. Additionally, it is noted that the electrical system can further comprise a load (not shown in FIG. 1), and the load can be the electric vehicle for example.

The master node 1 mentioned above can be the controller for managing the battery sets (i.e. the slave nodes 121-12N), and specifically, the controller considers the system status and the charging-discharging protection control. Thus, the master node 11 should accurately receive the battery set information to perform such control. The accuracy and the updating rate of the battery set information are important, and thus the master node 11 scans the reception registers of the slave nodes 121-12N per X second(s), X is 0.5 for example, and the master node 11 checks whether the data from the master node 11 to the slave nodes 121-12N are lost.

For example, when the reception register of the slave node 121 does not update its receiving data, this means a plurality of data collide with each other, or alternatively, the slave node 121 is interfered with the noise seriously, such that the slave node 121 operates is separated from the bus 13 forcedly and unable to receive the data from the master node 11. Accordingly, the master node 11 should reset the slave node 121 to link to the bus 13 again. Then, after the slave node 11 is reset, the battery set information of the slave node 121 can transmitted to the master node 11 while the slave node 121 receives the request for the battery set information successfully.

Figure 2:
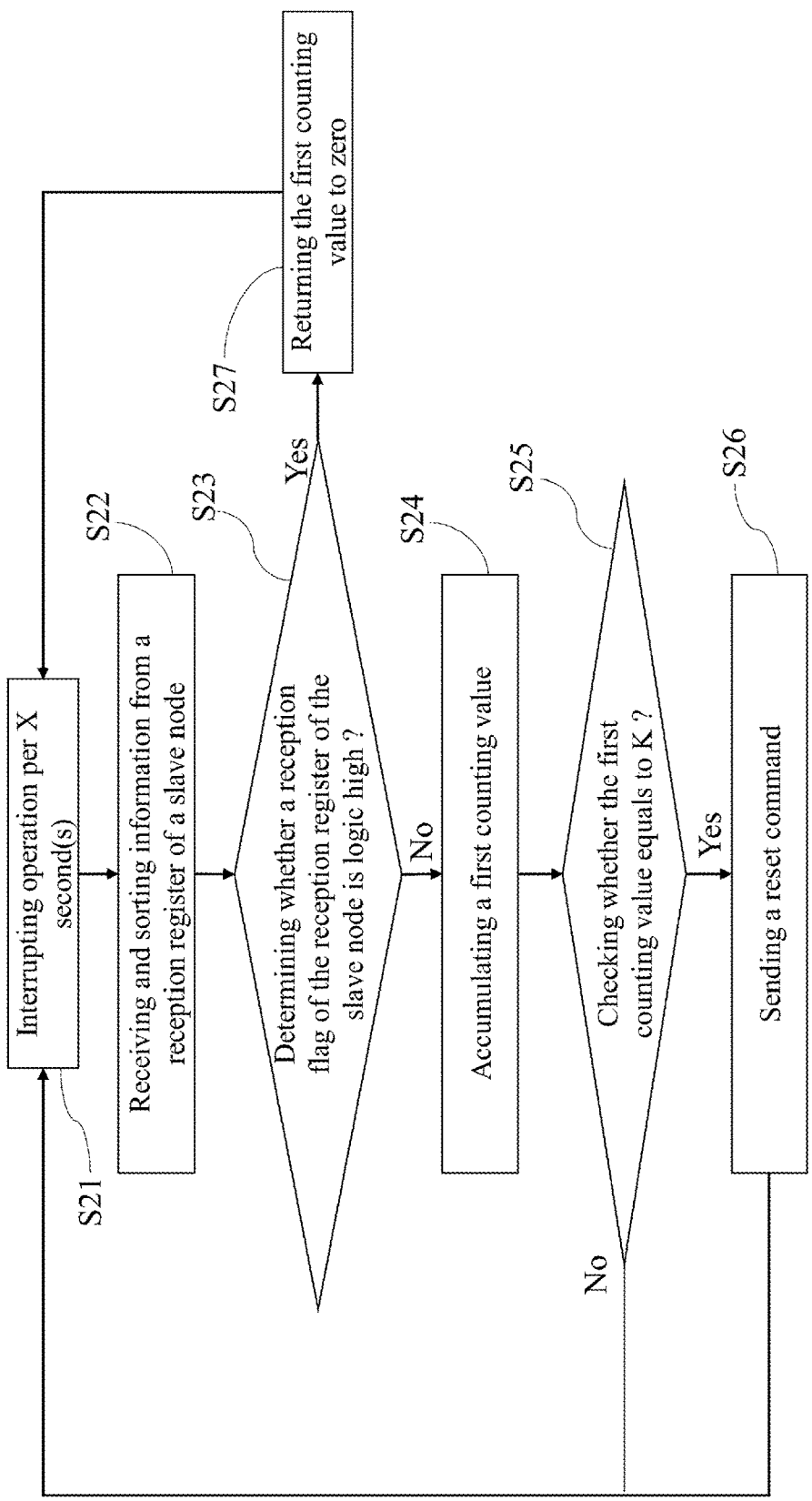
FIG. 2 is a flow chart of a link reestablishment method executed in a master mode in an electrical system according to an embodiment of the present disclosure.

Next, referring to FIG. 1 and FIG. 2, FIG. 2 is a flow chart of a link reestablishment method executed in a master mode in an electrical system according to an embodiment of the present disclosure. The flow chart of FIG. 2 assumes merely one slave node 121 exists for convenience of descriptions, and the present disclosure is not limited.

At step S21, the master node 11 interrupts its current operation per X second(s), wherein X can be 0.5 for example. Then, at step S22, the master node 11 receives and sorts information from a reception register of a slave node. Next, at step S23, the master node 11 determines whether a reception flag of the reception register of the slave node is logic high according to the information obtained by step S22.

When the reception flag is logic low, it means the reception register of the slave node 121 does not receive the new data, then step S24 is executed, and at step S24, the master node 11 accumulates a first counting value. When the reception flag is logic high, it means the reception register of the slave node 121 receives the new data, then step S27 is executed, and at step S27, the first counting value is returned to zero. After step S27 is executed, step S21 is then executed.

At step S25, the master node 11 checks whether the first counting value equals to K, wherein K is 5 for example. When the first counting value equals to K, it means the reception register of the slave node 121 does not receive the new data for a time period (i.e. K*X seconds) due to communication errors, thus step S26 is executed, and at step S26 the master node 11 sends a reset command to the slave node 121 to reset the slave node 121. Therefore, the reset slave node 121 can reestablish a link to the bus 13. When the first counting value does not equal to K, step S21 is then executed. Furthermore, after step S26 is executed, step S21 is executed.

It is obvious that while the number of the slave nodes 121-12N is larger than 2, the master node 11 scans the reception registers of each of slave nodes 121-12N. When one of the reception register of the slave nodes 121-12N does not receive the new data for the time period (i.e. several communication errors occurs continuously), the corresponding one of the slave nodes 121-12N is reset by the master node 11.

Furthermore, when CAN bus interface is adopted, the reset command can be designed as Table 1, wherein the frame of the reset command has an identifier of 1792 and 8 data segments, the data segment 0 is the module name, and data segments 1-7 are 0x00.

TABLE 1

| ID | DATA | | | | | | | |
|---|---|---|---|---|---|---|---|---|
| | 0 | 1 | 2 | 3 | 4 | 5 | 6 | 7 |
| 1792 | Module | 0x00 | 0x00 | 0x00 | 0x00 | 0x00 | 0x00 | 0x00 |

Back to FIG. 1, as mentioned above, stability of the communication is very important while the electrical system 1 is the battery system. When the slave node 121 for example cannot receive the data from the master node 11, it means the master node 11 is separated from the bus 13 forcedly due to several communication errors, or alternatively, the slave node 121 is separated from the bus 13 forcedly due to several invalid data (i.e. serious interference or noise exists, such as burst noise). However, the master node 11 has the highest communication priority, and the data from the master 11 may not suffer the data collision, such that the probability which the master node 11 is separated from the bus 13 forcedly is very low.

Thus, in the embodiment of the present disclosure, the slave nodes 121-12N adopts the WDT functions for solving the above technical problem. The WDT counts the time period which the reception register does not receive the new data, and the time period can be returned to zero while the reception register receives the new data. Once the time period of the slave node 121 for example is overtime, such as 2 seconds, the WDT sends the reset command to the microcontroller of the slave node 121, such that the slave node 121 is reset to reestablish the link to the bus 13.

Figure 3:
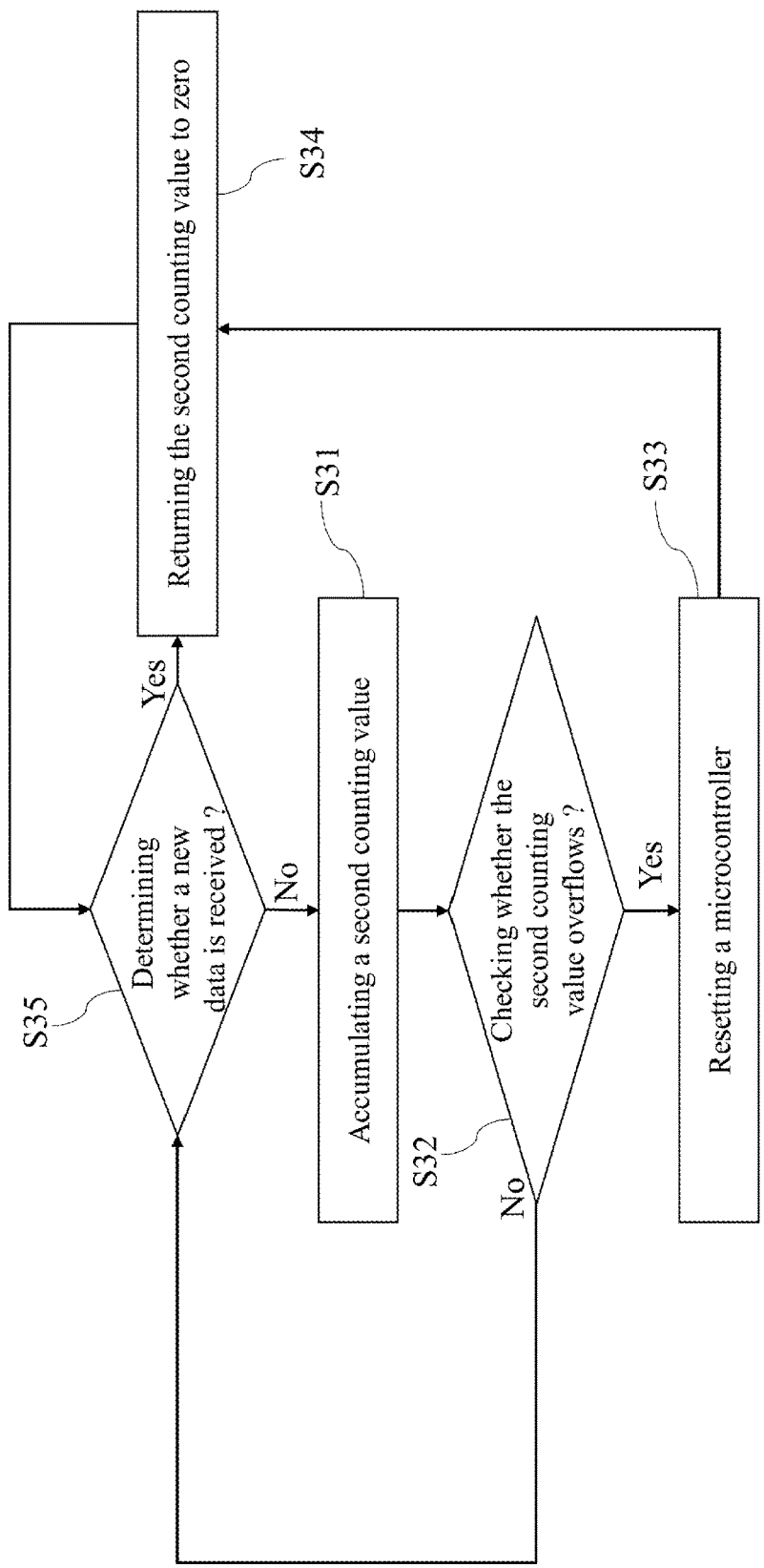
FIG. 3 is a flow chart of a link reestablishment method executed in a slave mode in an electrical system according to an embodiment of the present disclosure.

Next, referring to FIG. 1 and FIG. 3, FIG. 3 is a flow chart of a link reestablishment method executed in a slave mode in an electrical system according to an embodiment of the present disclosure. The following descriptions take the slave node 121 for example, and the present disclosure is not limited thereto.

At step S31, the slave node 121 uses the WDT in its microcontroller to accumulate a second counting value (i.e. the presentation of the time period counted by the WDT). Then, at step S32, the slave node checks whether the second counting value overflows (i.e. the time period is overtime). When the second counting value overflows, it means the reception register of the slave node 121 is separated from the bus 13, step S33 is executed, and at step S33, the slave node 121 reset itself (i.e. its microcontroller) by the WDT, such that the slave node 121 reestablish the link to the bus 13.

When the second counting value does not overflow, step S35 is executed. At steps S35, the slave node 121 determines whether its reception register receive the new data. When the reception register receives the new data, step S34 is executed, and at step S34, the WDT of the slave node 121 returns the second counting value to zero. When the reception register does not receive the new data, step S31 is then executed.

It is obvious that by using the WDT, the slave node 121 checks whether the reception register does not receive the new data for a long time period. When the slave node 121 is separated from the bus 13 forcedly, the reception register of the slave node 121 does not receive the new data for the long time period, and therefore, the slave node 121 reset itself to continue the communication with the master node 11 via the bus 13.

The embodiments of the present disclosure provide a link reestablishment method and an electrical system using the same, which are capable of resetting the slave nodes being separated from the bus forcedly to reestablish the link to the bus, such that the communication of the master node and the slave nodes can continue. Accordingly, the communication stability of the electrical system can be improved, such that the electrical system can be the battery system with the hierarchical energy management function for supplying stable electricity to the load, such as the electric vehicle.

While the present disclosure has been described by means of specific embodiments, numerous modifications and variations could be made thereto by those skilled in the art without departing from the scope and spirit of the present disclosure set forth in the claims.

What is claimed is:

1. A link reestablishment method executed in a master node of an electrical system, comprising:

step A: interrupting a current operation of the master node per X second(s), wherein X is a positive number and the electrical system is a battery system and the master node is a controller; and for each of slave nodes of the electrical system which communicate with the master node via a bus of the electrical system, wherein the slave nodes correspond to a plurality of battery sets respectively and the bus is a controller area network (CAN) bus:

step B: obtaining information from a reception register of the slave node;

step C: determining whether the reception register receives a new data;

step D: accumulating a counting value corresponding to the slave node while the reception register does not receive the new data;

step E: checking whether the counting value equals to K, wherein K is a positive integer larger than 2; and step F: sending a reset command to the slave node while the counting value equals to K to prevent the slave node from being forcedly separated from the CAN bus and operating in bus off mechanism of the CAN bus so as to facilitate the electrical system providing stable electricity.

2. The link reestablishment method according to claim 1, further comprising:

for each of the slave nodes:

step G: returning the counting value corresponding to the slave node to zero while the reception register receives the new data, and then going back to execute step A.

3. The link reestablishment method according to claim 1, further comprising:

for each of the slave nodes:

step H: going back to execute step A while the counting value does not equal to K; and step I: going back to execute step A after step F is executed.

4. The link reestablishment method according to claim 1, wherein at step C, to determine whether the reception register receives the new data, whether a reception flag is logic high is checked, wherein the reception flag being logic high means the reception register receives the new data.

5. The link reestablishment method according to claim 1, wherein the electrical system adopts CAN bus interface.

6. The link reestablishment method according to claim 5, wherein the battery system provides a hierarchical energy management function.

7. The link reestablishment method according to claim 1, wherein K is 5 and X is 0.5.

8. A link reestablishment method executed in a slave node of an electrical system, comprising:

at the slave node corresponding to a battery set of the electrical system which is a battery system using a controller area network (CAN) bus:

step A: accumulating a counting value;

step B: checking whether the counting value overflows;

step C: resetting the slave node itself while the counting value overflows to prevent the slave node from being forcedly separated from the CAN bus and operating in bus off mechanism of the CAN bus so as to facilitate the electrical system providing stable electricity;

step D: determining whether a reception register of the slave node receives a new data; and step E: going back to execute step A while the reception register of the slave node does not receive the new data.

9. The link reestablishment method according to claim 8, further comprising:
   step F: returning the counting value to zero while the reception register of the slave node receives the new data; and
   step G: returning the counting value to zero after step C is executed.

10. The link reestablishment method according to claim 8, wherein a WDT is used to accumulate the counting value and to determine whether the counting value overflows.

11. The link reestablishment method according to claim 8, wherein the counting value overflows means the reception register does not receive the new data for 2 seconds.

12. The link reestablishment method according to claim 8, wherein the electrical system adopts CAN bus interface.

13. The link reestablishment method according to claim 8, wherein the battery system provides a hierarchical energy management function, and the slave node is capable of communicating with a master node through the CAN bus.

14. An electrical system, comprising:
   a master node which is a controller;
   at least one slave node corresponding to at least one battery set;
   a bus, linked to both of the master node and the slave node, the bus being a controller area network (CAN) bus;
   wherein the master node check whether a reception register of the slave node does not receives a new data for a first time period, and resets the slave node while the reception register of the slave node does not receives the new data for the first time period; and the slave node checks whether the reception register of the slave node does not receives the new data for a second time period, and resets the slave node itself while the reception register of the slave node does not receives the new data for the second time period, wherein the slave node is reset or the slave node resets itself to prevent the slave node from being forcedly separated from the CAN bus and operating in bus off mechanism of the CAN bus so as to facilitate the electrical system providing stable electricity.

15. The electrical system according to claim 14, wherein the first time period is 2.5 seconds, and the second time period is 2 seconds.

16. The electrical system according to claim 14, wherein the electrical system adopts CAN bus interface.

17. The electrical system according to claim 16, wherein the electrical system is a battery system with a hierarchical energy management function.

18. The electrical system according to claim 14, wherein the master node checks whether a reception flag of the reception register is logic high, and the reception flag being logic high means the reception register receives the new data.

19. The electrical system according to claim 14, wherein a watch dog timer (WDT) of the slave node is used to count the second period time.

20. The electrical system according to claim 17, further comprising:
   a load being an electric vehicle.

\* \* \* \* \*